United States Patent

[11] 3,623,554

[72] Inventor Samuel A. Pence, Jr.
Tulsa, Okla.
[21] Appl. No. 33,487
[22] Filed Apr. 30, 1970
[45] Patented Nov. 30, 1971
[73] Assignee The Dow Chemical Company
Midland, Mich.

[54] METHOD OF PLUGGING SALINE FORMATIONS
8 Claims, No Drawings

[52] U.S. Cl. .................................................. 166/293, 166/294, 166/295
[51] Int. Cl. .................................................. E21b 33/138
[50] Field of Search .................................................. 166/292, 293, 294, 295, 285, 300, 278, 276

[56] References Cited
UNITED STATES PATENTS

| | | | |
|---|---|---|---|
| 2,146,480 | 2/1939 | Kennedy | 166/292 |
| 2,693,857 | 11/1954 | Marshall | 166/292 |
| 2,699,213 | 1/1955 | Cardwell et al. | 166/292 X |
| 2,747,670 | 5/1956 | King et al. | 166/292 X |
| 2,807,324 | 9/1957 | King et al. | 166/292 |
| 2,837,163 | 6/1958 | Ramos et al. | 166/292 X |
| 2,903,065 | 9/1959 | Holbrook et al. | 166/292 X |
| 3,208,525 | 9/1965 | Caldwell et al. | 166/295 |
| 3,306,870 | 2/1967 | Eilers et al. | 166/295 X |
| 3,396,790 | 8/1968 | Eaton | 166/293 X |

Primary Examiner—Stephen J. Novosad
Attorney—Griswold & Burdick

ABSTRACT: An improved method of plugging underground formations containing NaCl in aqueous solution by employing NaF.

METHOD OF PLUGGING SALINE FORMATIONS

BACKGROUND OF INVENTION

In the production or treatment for the purposes of improving production of a fluid from a geologic formation, it is often helpful and sometimes necessary to lessen the permeability of portions or limited zones of the formation. This entails, inter alia, plugging of certain interstitial spaces, channels, fissures, and the like with a solid to reduce the leak-off or dissipation of fluids and accompanying loss of energy as well as treating fluid involved in treatment or production. The term treatment as used herein includes cementing, drilling, fracturing sand consolidation, and the like involving the use of a fluid in an operation conducted in an underground formation penetrated by a wellbore.

Although a number of ideas have been presented and tried to lessen the undesirable loss of fluid into a formation, and need exists for a more expedient technique for temporarily plugging off the formation just prior to and while the cement slurry is being injected and is setting.

Various types of aqueous cement slurries have been used to provide underground plugs in attempts to meet this need. A problem inherent in the process of emplacing such plug is the loss of slurry or at least some of the water portion thereof prior to setting of the slurry to a monolithic solid.

HISTORY OF INVENTION

Often NaCl brine is found in the same formation from which oil and/or gas is sought to be produced.

I have discovered that, when sufficient NaF is emplaced in the formation so as to mix with the NaCl brine, wherein plugging is desired to be obtained, in an amount sufficient to provide at least about 4 grams thereof per liter of the NaCl brine present, sufficient NaCl is caused to precipitate out of the brine and settle in and to penetrate into the exposed faces of the porous formation to provide a temporary plug, whereupon subsequent but reasonably prompt placement, of a more permanent plugging composition (e.g. a settable aqueous hydraulic cement slurry or aqueous polymer-brine slurry or polymerglycol slurry), on the so temporarily plugged formation, there results a marked lessening of fluid loss.

SUMMARY OF INVENTION

The invention, therefore, is an improved method of plugging or more explicitly inhibiting fluid flow from or into a selected zone in an underground or subterranean formation, wherein NaCl brine is present, which comprises emplacing, admixing with, or injecting therein NaF in sufficient quantity to lower the solubility of NaCl in the brine which therefore results in precipitation of NaCl, thereby temporarily plugging to an effective extent the interstitial spaces, channels, fissures, and the like in the formation, and thereafter, while the temporary plugging exists, injecting a more-or-less or relatively permanent plugging material (on the precipitated NaCl), whereupon the permanent plugging material so emplaced sets without objectionable loss of fluid to the formation, due to the presence of the precipitated NaCl.

Although the second composition required to be employed above the precipitated NaCl is termed "more-or-less permanent," it may be of a nature that can be later dissolved or solubilized and removed, or be of a nature that it may be easily drilled out.

The materials recommended to be used for the more-or-less permanent composition are (1) aqueous slurries or solutions containing Portland cement, pozzolanic cement, aluminous cement, or expansive cement and/or an aqueous slurry or solution of natural or synthetic resins as described in U.S. Pat. No. 3,306,870. The settable resin compositions employ a brine and others employ water-glycol components with the natural or synthetic resin. Among the natural resins used are starch from a variety of plant life and in various forms and/or certain natural proteins or gums such as guar, tragacanth, and karaya. Among the synthetic resins used are polyacrylamides, polyvinylpyrrolidones, polystyrene, and polyvinyltoluene.

Expansive cements are well known in the art and are especially well described in U. S. Pat. No. 3,155,526; No. 3,251,701; and No. 3,303,037.

PRACTICE OF INVENTION

The invention has application to treating a geologic formation which is accessible from the ground level. Usually the formation concerned is a subterranean one penetrated by a wellbore wherein a valuable fluid is present in quantities sufficient to justify producing from the formation.

Broadly the method of the invention is carried out by emplacing or injecting, NaF, either dry or in aqueous solution, in the NaCl brine present in such formation, wherein a zone is sought to be closed off or plugged, in an amount sufficient to precipitate a substantial proportion of the NaCl which is present, in the vicinity of the place where the plug is ultimately to be located, It is recommended that a sufficient amount, of NaF be provided to ensure an amount of at least 4 grams, dry weight, thereof per 100 grams of the NaCl brine present at the plugging locus or site. Although NaF may be employed at the locus of the plugging operation in dry form but preferably an aqueous slurry of NaF is employed. The latter may be pumped conveniently to the locus. It is estimated that about 26 grams of NaCl precipitates from 100 grams of substantially saturated NaCl brine when the NaF concentration of the brine reaches 4 grams per 100 grams of the salt solutions. NaF, much in excess of that amount is quite acceptable but usually unnecessary NaCl thereupon precipitates, filling voids in the porous formation in the immediate vicinity thereby providing a plug to serve as a base for subsequently injected settable cement or resin slurry.

One mode of practicing the invention is first to place sand, rock fragments, gravel, bits of shard, or the like, on the site where a plug is desired, to provide a porous base, and thereafter admix the NaF with the NaCl brine.

A preferred mode of practicing the invention is to follow the step, wherein NaCl has been precipitated, by injecting a quantity of gravel or coarse sand and positioning it on the precipitated NaCl.

Thereafter (whether having employed the post injection of sand or gravel embodiment or not) a permanent-type plug is provided. This usually consists of emplacing an aqueous slurry of any one of the many acceptable API classes of well treating Portland cements or aluminous, pozzolanic, or expansible cement. The slurry of hydraulic cement so used will not undergo the usual loss (often excessive) of water from the slurry during the injection and setting periods.

The practice of the invention is illustrated by the following examples:

Example 1

A substantially vertical shaft had been drilled into a salt dome to a distance of 800 feet. The shaft was cased with a 36-inch diameter pipe. The shaft had filled with salt water (chiefly NaCl brine) to a level of 60 feet from ground level. The objective of this treatment is to plug-off the lower 100 feet of the shaft.

To conduct such treatment, rock fragments and gravel are emplaced in the lower 98 to 100 feet of the shaft. Sand, to provide a thickness of about 1 to 2 feet, is deposited on top of the rock and gravel. Solid finely particulated or granular NaF is then deposited on top of the sand. The amount of NaF should be sufficient to completely cover the top surface of the 36-inch diameter pipe to a depth of at least about 1 inch but preferably to a depth of several inches. The NaF causes NaCl from the brine to precipitate into crevices, pores and channels and other openings.

Thereafter an aqueous slurry of a settable hydraulic cement, e.g. pozzolanic, aluminous, expansive or Portland, is pumped down the shaft coming to rest on top of the NaF.

Loss of the slurry or water from the slurry, prior to its setting to a solid, is thereby greatly lessened by this practice because the added NaF, thus causing the NaCl already present to precipitate out of the brine and to deposit in the interstitial spaces of the rock and sand, and, to some extent, penetrate farther down among the fragments and gravel inhibits the loss of fluid from the subsequently emplaced cement slurry.

Example 2

The procedure of Example 1 is substantially followed except that an aqueous solution of NaF, in an amount sufficient to provide at least about 4 grams of NaF per 100 grams of NaCl brine present in the immediate vicinity of the plug, was pumped down the shaft, instead of depositing granular NaF, as in example 1. Temporary plugging off of the zone to be cemented 1. thereby attained.

Example 3

The procedure of example 1 is again followed generally, except that the composition emplaced following the NaF was one comprising: water, a resin, and a soluble salt, prepared according to any defined in the claims of U. S. Pat. No. 3,306,870, e.g. polyacrylamide, $CaCl_2$ and $FeCl_3$, and water. Again a temporary plug of NaCl is provided.

Example 4

A permeable unconsolidated sand zone in a geologic formation containing salt water (chiefly NaCl brine) has been penetrated by a wellbore of a conventional diameter, e.g. one of 6 to 10 inches, for the production of an underground fluid, e.g. oil, water, brine, (or solubilized salt deposits). It is desired to restrain movement of the sand, i.e. inhibit the freedom of fluids to enter and carry suspended sand into the wellbore while the well is being serviced or worked over.

An aqueous solution of NaF is prepared (preferably nearly or completely saturated) and pumped down the wellbore to the level of the work-over servicing operation (as controlled by properly emplaced packers) and thence forced, according to conventional squeeze techniques, into the formation at the level where the operation is to be performed, thereby precipitating NaCl from the brine and forcing the so precipitated NaCl into the interstices of the sand. The precipitated NaCl granules bridge the interstices of the sand and inhibit the interference of sand into the wellbore during the servicing or work-over operation.

If desired as in the earlier examples, the NaF solution may be followed by another temporary type of sealant to supplement the plugging effect of a precipitated NaCl. A fluid, settable to a solid but fluidizable by a pH change, as by a subsequently injected chemical may be used if desired. Such types of temporary seals, by nature, are not converted into a seal nearly so promptly as the precipitated NaCl. The earlier injected NaF does, when so used, greatly reduce the loss of fluid from the latter injected fluid for temporary sealing of the porous walls of the zone to be treated.

Having described my invention, what I claim and desire to protect by Letters Patent is:

1. The method of plugging-off a permeable subterranean formation penetrated by a wellbore, NaCl brine being present in the formation, comprising:
   a. injecting into and down the wellbore a fluoride salt in sufficient quantity to precipitate substantial amounts of NaCl from the brine whereby so precipitated NaCl deposits in intersticial spaces among the formation grains thus providing a temporary sealant against fluid flow;
   b. promptly injecting a slurry of a composition settable in situ to a solid at the locus where the fluoride salt was injected; and
   c. allowing said slurry to set to a monolithic solid to provide a relatively permanent seal.

2. The method according to claim 1 wherein the fluoride salt is NaF.

3. The method according to claim 2 wherein sufficient NaF is injected to provide at least about 4 grams thereof per 100 grams of NaCl brine present in the vicinity of the site on which the plug is to be placed.

4. The method according to claim 1 wherein a layer of sand, gravel, particulated rock fragments, shard and mixtures thereof is provided at the site on which and into which the NaCl is to be precipitated as a result of subsequently admixing NaF with the brine in the vicinity of the site where the plug is sought to be formed.

5. The method according to claim 1 wherein, following the placement of NaF, there is placed thereon a layer of particulated material selected from the class consisting of rock fragments, gravel, sand, particulated shard, ceramic, and the like and mixtures thereof, prior to injecting therein said slurry settable to a monolithic solid.

6. The method according to claim 1 wherein the composition settable in situ to a monolithic solid is a settable slurry comprising a brine, a particulated brine-soluble resin selected from the class consisting of polyacrylamide, polyvinylpyrrolidone, polystyrene, polyvinyltoluene, starch, natural gums, natural proteins, and mixtures thereof.

7. The method according to claim 1 wherein the composition settable in situ to a monolithic solid is a slurry comprising water and an hydraulic cement selected from the class consisting of Portland, aluminous, pozzolanic, and expansible cement, and mixtures thereof.

8. The method according to claim 1 wherein the composition settable to a monolithic solid comprises in sequence both an aqueous-resin-salt composition and an hydraulic cement-water composition located in juxtaposition to each other, following emplacement of the NaF.

* * * * *